United States Patent [19]
Dobson

[11] Patent Number: 4,662,729
[45] Date of Patent: May 5, 1987

[54] CLIP-ON CUFFS FOR EYEGLASS TEMPLES

[76] Inventor: Johnnie M. D. Dobson, 12 Kings Rd., Naples, Fla. 33962

[21] Appl. No.: 724,821

[22] Filed: Apr. 18, 1985

[51] Int. Cl.[4] ............................................... G02C 5/14
[52] U.S. Cl. .................................... 351/123; 351/122
[58] Field of Search ................. 351/111, 122, 123, 117

[56] References Cited
U.S. PATENT DOCUMENTS

| | | | |
|---|---|---|---|
| 2,031,771 | 2/1936 | Grier | 351/123 |
| 2,626,338 | 1/1953 | Frum | 351/123 |

*Primary Examiner*—Rodney B. Bovernick
*Assistant Examiner*—P. M. Dzierzynski
*Attorney, Agent, or Firm*—Merrill N. Johnson

[57] ABSTRACT

A pair of clip-on cuffs for attachment onto the ear-engaging portion of the temples of a pair of eyeglasses. The cuffs are preferably made of translucent acrylic material and are C-shaped in cross-section to fit over and firmly grip the ear-engaging portion of each temple. The cuffs cover about an inch of the temple's length and have a thickness of about 1/32nd of an inch. The outer surface of each cuff includes a series of smoothly raised areas such as parallel ridges, cross-hatched ridges or hemispherical protuberances to increase the traction between the eyeglasses and the skin of the wearer.

5 Claims, 6 Drawing Figures

CLIP-ON CUFFS FOR EYEGLASS TEMPLES

BACKGROUND AND SUMMARY OF THE INVENTION

My invention relates to devices for maintaining the correct position of a pair of eyeglasses on the bridge of the nose and preventing the eyeglasses from sliding forward and working their way out of position down the nose of the wearer.

Wearers of eyeglasses have long suffered with glasses which tend to slide down the wearer's nose and out of their intended position. The major cause appears to be failure of traction between the eyeglasses and the head during violent or repeated movement of the wearer's head.

I have invented a unique pair of clip-on cuffs for attachment to the ear-engaging portion of the temples of a pair of eyeglasses. Preferably my cuffs are made entirely of hard-surfaced acrylic material C-shaped in cross-section to fit over and firmly grip the ear-engaging portion of each temple. In order to maintain the eyeglasses in their intended position on the bridge of the nose, the outer surface of my clip-on cuffs contains a series of smoothly raised areas which provide improved traction with the skin of the upper ear and adjacent skull of the wearer.

There have been numerous suggestions in prior patents for maintaining the position of eyeglasses on the wearer's nose and head. These suggestions have included devices intended to increase the traction between the eyeglass temples and the wearer's head. See, for example, U.S. Pat. Nos. 2,031,771; 2,959,098; 4,165,925 and 4,204,749. However, so far as I am aware, the devices shown in these prior art patents have had no market acceptance.

Moreover, the traction-increasing devices shown in U.S. Pat. No. 2,031,771 (drag member 1), in U.S. Pat. No. 2,959,098 (strip 10) and in U.S. Pat. No. 4,204,749 (jacket 51) are all made of soft rubber which tends to deteriorate and becomes worn and unsanitary in use. The diagonal gripping ridges 15 and 16 of U.S. Pat. No. 4,165,925 are located at the nose bridge and the extreme ends of the temples.

In contrast to the prior art, my clip-on cuffs provide traction at the areas I have found to be most effective in preventing the pair of eyeglasses from slipping forward on the nose, namely, the upper ear-engaging portion of each temple. And being made of a hard-surfaced material rather than soft rubber, my cuffs do not deteriorate nor become unsanitary despite constant use. Moreover, the smoothly raised ridges or protuberances on the outer surface of my cuffs provide more effective and reliable and more comfortable traction with the wearer's skin than the soft rubber used in prior art devices.

My clip-on cuffs control the alignment of the pair of eyeglasses despite violent or repeated movement of the head. Even in warm and humid weather, my cuffs maintain sufficient traction between the temples of the glasses and the skin of the ear and head to prevent the glasses from slipping down the wearer's nose. They can be quickly and easily attached to any existing pair of eyeglasses.

DETAILED DESCRIPTION OF THE PREFERRED EMBODIMENTS

Figure 1:
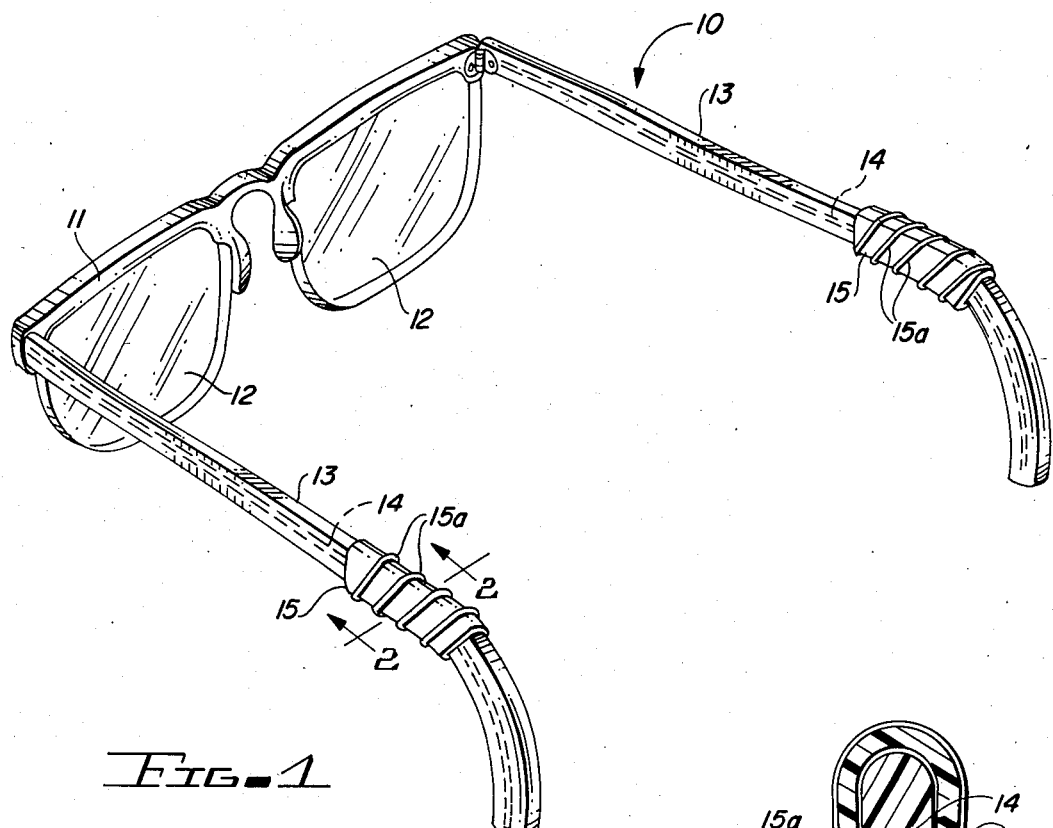
FIG. 1 is a perspective view of a pair of eyeglasses with a pair of my cuffs clipped onto the temples of the eyeglasses.

Referring now to the drawings, a conventional pair of eyeglasses 10 are illustrated in FIG. 1 with a pair of my cuffs 15 clipped onto the ear-engaging portion of the temples 13 of the glasses. Eyeglasses 10 include an acrylic or metal frame 11 supporting a pair of lens 12. Temples 13 as shown are made of acrylic thermoplastic material and include a metal wire core 14.

Figure 2:
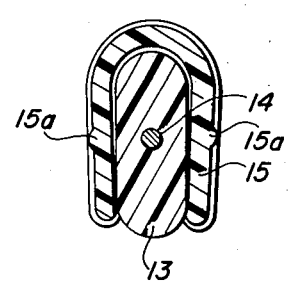
FIG. 2 is a cross-sectional view taken along line 2—2 of FIG. 1 showing my cuff clipped onto a temple of a pair of eyeglasses.
Figure 3:
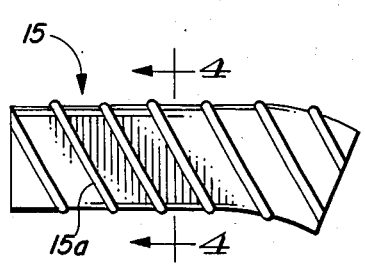
FIG. 3 is a side view of a preferred embodiment of my clip-on cuff.
Figure 4:
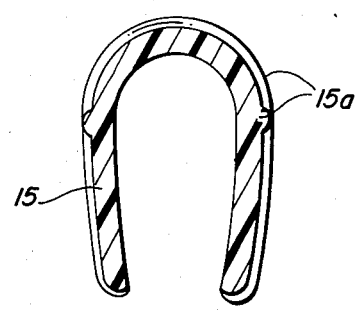
FIG. 4 is a cross-sectional view taken along line 4—4 of FIG. 3 showing a preferred form of my clip-on cuff.

As best shown in FIGS. 2 and 4, cuff 15 is C-shaped in cross-section so as to fit over and firmly grip the ear-engaging portion of temple 14. And as shown in FIG. 3, cuff 15 is designed to follow the contour of the ear-engaging portion of the temple and to cover about one inch of the temple's length. Preferably, the cross-sectional thickness of the cuff is kept thin in order to keep the bulk of the cuff as small as possible. An optimum thickness is about 1/32nd of an inch.

To provide a cosmetically pleasing product, the cuffs may either be made of crystal clear thermoplastic material or may be colored to match the color or tint of the temples. And since the temples of glasses may vary in cross-sectional size and shape, my clip-on cuffs come in a variety of sizes to fit over and securely grip the surface of the temple.

In order to increase the traction between the temples of the glasses and the wearer's skin adjacent to the upper ear, the outer surface of each cuff includes a series of smoothly raised areas. These raised areas may take a variety of forms which serve to increase the traction between the temples and the adjacent skin of the wearer.

The preferred form of the cuff shown in FIGS. 1–4 contains a series of parallel diagonal raised ridges 15a. Ridges 15a rise about 1/32nd of an inch above the flat surface of cuff 15 and ridges 15a are preferably about ⅛th of an inch apart.

Figure 5:
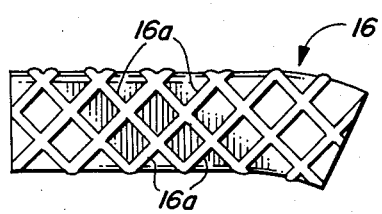
FIG. 5 is a side view of an alternative form of my clip-on cuff in which the outer surface of the cuff is cross-hatched.
Figure 6:
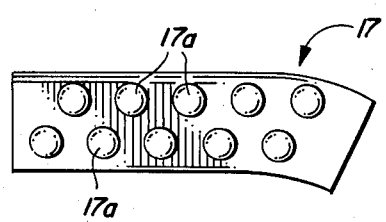
FIG. 6 is a side view of a further alternative form of my cuff in which the outer surface includes a series of raised hemispherical protuberances.

Two effective alternate forms of the outer surface of the cuff are shown in FIGS. 5 and 6. Cuff 16 shown in FIG. 5 has identical dimensions with cuff 15, except for the form of the traction-increasing outer surface of cuff 16. The outer surface of cuff 16 is cross-hatched with a series of diagonally spaced intersecting ridges 16a similar to the parallel diagonal ridges 15a of cuff 15.

The outer surface of cuff 17 shown in FIG. 5 eliminates the ridges used in cuff 15 and cuff 16. Instead, the entire smooth outer surface of cuff 17 contains a series of raised hemispherical protuberances which serve to increase the traction between the skin of the wearer and the eyeglasses. Other forms of smoothly raised areas on the outer surface of my cuffs will suggest themselves to those skilled in the art.

While I have shown and described three preferred embodiments of my cuffs, modifications and improvements may suggest themselves to those skilled in the art. Thus the scope and spirit of my invention are limited only by the claims appended to this application.

I claim:

1. A pair of clip-on cuffs for attachment to the temples of a pair of eyeglasses, each cuff comprising
   a thin elongated cuff made entirely of solid non-resilient hard-surfaced thermoplastic material,
   said cuff being C-shaped in cross-section so as to fit over and firmly grip the upper ear-contacting portion of the temple, and
   the outer surface of said cuff having a series of identical solid non-resilient raised hemispherical protrusions designed to contact the skin of the upper ear and adjacent skull of the wearer.

2. A pair of clip-on cuffs as set forth in claim 1 further characterized in that the elongated length of the cuffs is approximately one inch.

3. A pair of clip-on cuffs as set forth in claim 1 further characterized in that the cuffs are made of translucent acrylic material.

4. A pair of clip-on cuffs for attachment to the temples of a pair of eyeglasses, each cuff comprising
   a thin elongated cuff made entirely of solid acrylic thermoplastic hard-surfaced material,
   said cuff being C-shaped in cross-section so as to fit over and firmly grip the upper ear-contacting portion of the temple,
   the elongated length of said cuff being approximately one inch, and
   the outer surface of said cuff containing a series or parallel solid non-resilient raised ridges running diagonally across said outer surface.

5. A pair of clip-on cuffs as set forth in claim 4 further characterized in that the outer surface of each C-shaped cuff has a cross-hatched pattern.

* * * * *